United States Patent [19]

Murch et al.

[11] 4,066,578

[45] Jan. 3, 1978

[54] HEAVILY LOADED FLAME RETARDANT URETHANE AND METHOD

[75] Inventors: Robert M. Murch, Ashton; Mary Lynn Wilson, Baltimore; Louis Leonard Wood, Rockville, all of Md.

[73] Assignee: W. R. Grace & Co., New York, N.Y.

[21] Appl. No.: 649,127

[22] Filed: Jan. 14, 1976

[51] Int. Cl.$^2$ ................ C08G 18/10; C08G 18/14; C08K 3/22

[52] U.S. Cl. .............. 260/2.5 AG; 260/2.5 AD; 260/2.5 AK

[58] Field of Search ............... 260/2.5 AK, 2.5 AG, 260/2.5 AD

[56] References Cited

U.S. PATENT DOCUMENTS

| | | | |
|---|---|---|---|
| 3,262,894 | 7/1966 | Green | 260/2.5 AK |
| 3,810,851 | 5/1974 | Norman | 260/2.5 AK |
| 3,897,372 | 7/1975 | Kehr | 260/2.5 AK |

FOREIGN PATENT DOCUMENTS 7,413,209   4/1975   Netherlands ............... 260/2.5 AD Primary Examiner—C. Warren Ivy
Attorney, Agent, or Firm—Philip M. Pippenger; Kenneth E. Prince

[57] ABSTRACT

The invention disclosed relates to a new polyurethane composition having improved flame retardance and to a method for preparing same. The present composition is prepared by using a suspending agent and a surfactant. The suspending agent may be either a surfactant or an appropriate polymer, but to control the cellular structure, a surfactant that does not perform as a suspending agent is desirable. The resultant composition may be sprayed through a high pressure spray gun while permitting formation of heavily loaded flame retardant urethane foams which are neither dusty nor lose solids upon washing.

15 Claims, No Drawings

HEAVILY LOADED FLAME RETARDANT URETHANE AND METHOD

This invention relates to a new polyurethane composition having improved flame retardancy and to a method for preparing such compositions.

Numerous attempts have been made in the prior art seeking solutions to improving flame retardancy for polyurethane compositions. Typically, these attempts have provided compositions which only limitly improve the flame retardant capacity while greatly increasing the cost of the final composition.

It has also been recognized that to obtain really good fire retardancy, high loadings of hydrated alumina were possible when coupled with certain phosphorous compounds. One example of such a formulation is that disclosed in U.S. patent application Ser. No. 588,092 filed June 18, 1975, (Disclosure No. 4898) by Marans et al. This mixture has two drawbacks. It cannot be sprayed through high pressure nozzles, and the resulting foam is "dusty" and not resistant to washing. It has been found, however, that by practice of the present invention, there results a new improved flame retardant polyurethane which is easily prepared both commercially and economically, by using a suspending agent, either a surfactant or appropriately active polymer, to suspend the alumina hydrate which overcomes the spraying problem, and by using a surfactant, preferably one with a significantly different chemical structure, to prepare soft, resilient foams that are not dusty, can be readily washed and also exhibit good physical properties.

By the present method, flame retardant polyurethanes may be prepared having hydrophilic crosslinked polyurethane structures by reacting a particular isocyanate capped polyoxyethylene polyol with large amounts of an aqueous slurry of an alumina hydrate and a particular combination of surfactants. The thus generated polyurethane having alumina hydrate uniformly disposed throughout may be sprayed, and the product foam is found to have improved flame retardancy without dusting even upon washing.

Generally, the present polyurethane composition includes a hydrophilic polyurethane structure having uniformly dispersed therein an alumina hydrate powder additive which is effectively contained without dusting even upon washing.

Because the additives employed herein must be uniformly dispersed in the polyurethane structure, it is advantageous to generate a hydrophilic polyurethane from relatively large amounts of water or aqueous reactant. In this manner, the alumina hydrate additive can be introduced during the reaction step or by spraying and thereby insure uniform distribution. The product foam effectively contains the alumina hydrate without dusting even upon washing.

One group of polyurethanes useful herein are disclosed in co-pending, commonly assigned U.S. patent application Ser. No. 250,012 filed May 3, 1972, now abandoned, the effective portions of the disclosure of which are incorporated herein by reference. Generally, these foams are crosslinked polyurethane foams prepared by using a capped polyoxyethylene glycol reactant and massive amounts of water.

The polyoxyethylene polyols used in this invention are water soluble reaction products derived from the polymerization of ethylene oxide in the presence of a polyfunctional starter compound such as water, ethylene diamine ethylene glycol, glycerol, pentaerythritol, sucrose and the like. The molecular weights may be varied over a wide range by adjusting the relative ratios of ethylene oxide monomer to starter compound. The preferred molecular weight ranges are described subsequently.

It is possible and sometimes desirable to incorporate various amounts of a relatively hydrophobic comonomer into the ethylene oxide based polymerization products. Thus, comonomers such as propylene oxide or butylene oxide may be copolymerized as a random copolymer, block copolymer, or both, such that the copolymers remain hydrophilic while having other desirable features for certain applications, namely improved low temperature flexibility, resistance to compression set, resiliency and the like. Up to about 40–60 mole percent but desirably about 25–45 mole percent of the relatively hydrophobic comonomer may be copolymerized with the ethylene oxide monomer and still yield hydrophilic crosslinked network foams when those products are used as polyol intermediates in practicing the present invention. Thus, throughout this text, the term "polyoxyethylene polyol" is intended to include not only homopolymers of ethylene oxide, but also hydrophilic copolymers of ethylene oxide such as those described above, wherein all of the polyol derivatives have a hydroxyl functionality of about two or greater and an ethylene oxide content ranging from about 40 mole percent to about 100 mole percent, and preferably greater than about 55 mole percent.

Particularly useful foams may be prepared by first capping a polyoxyethylene polyol with a polyisocyanate such that the capped product has a reaction functionality greater than 2. Thereafter, the resin is reacted by combining with water such that a crosslinked foam result. It is also possible to use a capped polyoxyethylene polyol having a functionality approximating 2 in which case a polyfunctional reactive member such as one having three, or up to about 8 reactive amine, hydroxy, thiol, or carboxylate sites per average molecule is included to form a three dimensional crosslinked product. Useful polyfunctional reactive members include materials such as diethylenetriamine, triethylenetetramine, tetraethylene-pentamine, polyethyleneimine, glycerol, trimethylolpropane, pentaerythritol, tolylene-2,4,6-triamine, ethylenediamine, trimethylenediamine, tetramethylenediamine, pentamethylenediamine, hexamethylenediamine, aminoethanol, diethanolamine, hydrazine, triethanolamine, benzene-1,2,4- tricarboxylic acid, nitrilotriacetic acid, citric acid,4,4',-methylenebis (p-chloraniline), and the like.

Polyoxyethylene polyol used as a reactant in preparing the capped product to be formed may have a weight average molecular weight of about 200 to about 20,000, and preferably between about 600 to about 6,000, with hydroxyl functionality of about 2 or greater, preferably from about 2 to about 8.

Polyoxyethylene polyol is capped by reaction with a polyisocyanate or polyisothiocyanates. The capping materials include PAPI (a polyaryl polyisocyanate as defined in U.S. Pat. No. 2,683,730), tolylene diisocyanate, triphenylmethane-4,4',4",-triisocyanate, benzene-1, 3,5-triisocyanate, toluene-2,4,6-triisocyanate, diphenyl-2, 3,3'-triisocyanate, hexamethylene diisocyanate, xylene diisocyanate, naphthalene-1, 5-diisocyanate, xylene-alpha, alpha' diisothiocyanate, 3,3'-dimethyl-4,4'-biphenylene diisocyanate, 3,3'-dimethoxy-4,4'-biphenylene diisocyanate, 2,2' 5,5'-tetramethyl-4,4'-biphenylene diisocyanate, 4,4'-methylenebis (phenylisocyanate), 4,4'-sulfonylbis (phenylisocyanate), 4,4'-methylene di-ortho-tolylisocyanate, ethylene diisocyanate, ethylene diisothiocyanate, trimethylenediisocyanate and the like.

Capping of the polyoxyethylene polyol may be effected using either about stoichometric amounts of reactants or an excess of isocyanate to insure complete capping of the polyol.

To effect foaming and preparation of the crosslinked network polymer, the component including the isocyanate capped polyoxyethylene polyol having a functionality about 2 or greater is simply combined with water by most any suitable means such that a crosslinked hydrophilic foam results.

Because foaming of the present resin reaction is effected simply, it is possible to add the surfactants to either the resin reactant, or to the water reactant or to both. Also, supplemental materials such as those well known to the artificial sponge foaming art maybe added as desired, provided they do not detrimentally affect the product foam.

The significance of adding materials such as alumina hydrate may be realized by means of the Oxygen Index Method, a flammability test for plastics, ASTM D-2863-70. This method describes a procedure for determining the relative flammability of polyurethane by measuring the minimum concentration of oxygen in a slowly rising mixture of oxygen and nitrogen that will just support combustion.

The oxygen index value as used herein is the minimum concentration of oxygen, expressed as volume percent, in a mixture of oxygen and nitrogen that will just support combustion of a material under the conditions of this method.

The minimum concentration of oxygen in a slowly rising mixture of oxygen and nitrogen that will just support combustion is measured under equilibrium conditions of candle-like burning. The balance between the heat from the combustion of the specimen and the heat lost to the surroundings establishes the equilibrium. This point is approached from both sides of the critical oxygen concentration in order to establish the oxygen index.

Another significant and unexpected value of the present polyurethane composition resides in the low smoke density determination. Accordingly, not only does the present composition have a superior flame retardant value, but also this advantage is supplemented by the fact that should some portion of the composition be consumed by flame, the consumption produces very low smoke density relative to other polyurethane structures which do not include the present additives.

Typically, polyurethane compositions which do not include addition of the additives now found to be essential, have an oxygen index value of about 0.15 to about 0.30 at best. In contrast, the present polyurethane compositions have corresponding oxygen index values up to about 0.40 and greater without resultant dusting or loss of solid additives even upon washing as is often experienced in prior developed formulations.

The present polyurethane compositions include about 50 to about 400 parts of alumina hydrate additive per 100 parts of prepolymer resin to be reacted. Preferably, amounts of about 100 to about 275 of alumina hydrate, same weight basis, are employed.

Alumina hydrates, also commonly called hydrated aluminas, for use herein, are known and are highly refined, inorganic white granular crystalline powders with the chemical formula of $Al_2O_3 \cdot XH_2O$, such as especially, $Al_2O_3 \cdot 3H_2O$. These materials generally are produced by the Bayer process from bauxite ore and contain small amounts of soda, iron oxide and silica. They are chemically inert and have been used as a filler in organic systems where a filler is normally employed.

The particle size of useful alumina hydrate ranges from an average particle size of about 0.5 to about 120 microns. Fine particles having a size of about 6.5 to about 9.5 microns are particularly useful. Also, where color of the resultant polyurethane is important, the aluminum hydrate should have a snow-white color grade.

Phosphorus containing compounds may optionally be included herein if desired, such as phosphites, polyphosphites, ammonium phosphates, polyphosphates, phosphate salts, organic phosphates, phosphonates and polyphosphonates, and mixtures thereof.

The phosphorus containing additive, when included, are in an amount from about 1 to about 200 parts by weight per 100 parts by weight polymer to be reacted and preferably about 2 to about 100 parts, similar weight basis.

A number of phosphorus containing additives are available and may be used herein. One useful material is sold under the mark Phosgard C-22-R by Monsanto. This material has the structural formula:

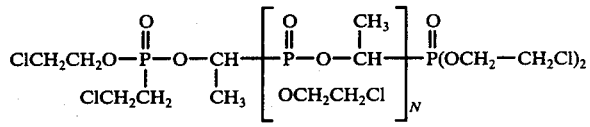

Because the above formulated material is insoluble in water, it may be added to the reaction by means of an emulsion, suspension or dispersion as desired, but is usually added as a liquid misable in the prepolymer phase.

An additional phosphorus containing additive for possible use in combination with aluminum hydrate to prepare the present polyurethane compositions is ammonium polyphosphate, available under the mark Phoschek P/30 by Monsanto.

Specific phosphorus containing materials which may be useful include, but are not limited to, derivatives of $P_2O_5$, phosphorus acid, phosphorus acid and phosphorus halides; ureaphosphoric acid, monophenyl phosphate and the like; sodium hexametaphosphate, ammonium salts of phosphonomethylated ethers, and the like; monoammonium phosphate, diammonium phosphate and the like; melamine phosphate and salts of phosphorus or phosphoric acid with organic amines; salts of urea-phosphoric acid, monophenyl phosphate, phosphorus pentoxide or chlorides of partially esterified phosphoric acids. Phosphonomethylated ethers, diethyl chlorophosphate, triallyl phosphate, phosphoroxytriamide and the like may also prove useful; also tris ($\beta$-chloroethyl) phosphate, tris (2,3-dibromopropyl) phosphate, etc.

It is also possible to use materials such as tricresyl phosphate, cresyl diphenyl phosphate, 2-ethylhexyl diphenyl phosphate, trialkyl phosphate and triaryl phosphate as a source of phosphorous for the present polyurethane composition. Another useful source of phosphorous for possible use herein is that marketed as Fyrol 6, a composition by Stauffer having the formula:

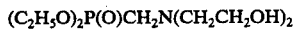
(C₂H₅O)₂P(O)CH₂N(CH₂CH₂OH)₂

A wide variety of known phosphorous sources are available for use herein. It is important, however, to realize that the phosphorous source must be included along with the aluminum hydrate additive.

To effect foaming and preparation of the crosslinked network polymer, the component including the isocyanate capped polyoxyethylene polyol having a functionality about 2 or greater is simply combined with a particular aqueous component. For simplicity, this isocyanate capped reaction component will be referred to herein as the resin reactant.

The aqueous component may appear as water, a water slurry or suspension, a water emulsion, or a water solution having water soluble materials disposed therein. For convenience, the aqueous component is referred to herein as the aqueous reactant.

In contrast to typical polyurethane reactions such as those using catalyst or like promoters where one mole of —NCO is reacted with one-half mole water, the present reaction proceeds simply with a large but controlled excess of water.

In typical polyurethane reactions known to the art, it is known to employ an excess of water in prepolymer foaming formulations to obtain improved properties. This has been observed at page 43 in the publication by Saunders and Frisch entitled "Polyurethanes," published by Interscience Publishers, where it is further observed that if less than stoichiometric amounts of water are used, the foam is more crosslinked, firmer, has lower elongation and higher density. A large excess of water, they observe, will use up the free isocyanate groups, leaving insufficient isocyanate available for effective crosslinking and resulting in the formation of many free amino end groups. As water content increases, the foam density decreases and above 30-50% excess water over stoichiometry results in a marked decrease in physical properties.

The dramatic way in which the addition of water influences practice of the present invention is seen by consideration of the Water Index:

$$\frac{\text{equivalents of H}_2\text{O} \times 100}{\text{equivalents of NCO}} = \text{Water Index Value}$$

Here, keeping in mind that in polyurethane foaming reactions one mole of water ultimately consumes two NCO groups, i.e. 1.0 mole H₂O – 2 equivalents —OH which react with 2 equivalents of NCO, Water Index Value of 100 indicates the equivalents of water and equivalents of isocyanate are balanced. An Index of 95 indicates that there is a 5% shortage of water equivalents while an Index of 105 indicates a 5% surplus of water equivalents. A slight shortage of water equivalents (i.e. a slight excess of isocyanate), usually 3–5%, is common practice in the prior art, particularly with flexible foams.

Using the present resin reactant and water in amounts from about 0.5 mole H₂O/mole NCO groups (H₂O Index Value of 100) up to about 2 moles H₂O/mole NCO groups (H₂O Index Value of 400) results in poor foaming unless materials such as surfactants and catalysts or the like are included. Amounts up to about 2 moles H₂O/mole NCO (H₂O Index Value of 400) require a catalyst. When using about 6.5 moles H₂O mole/NCO groups (H₂O Index Value of 1300) up to about 390 moles H₂O/mole NCO groups, (H₂O Index Value 78,000) surprisingly good foams result which improve in characteristics with added amounts of molar water. Thus, the available water content in the aqueous reactant is from about 6.5 to about 390 moles H₂O/NCO groups in the resin reactant, i.e. an H₂O Index Value of about 1300 to about 78,000 and desirably from about 4,000 to about 40,000, i.e. about 20 to about 200 moles H₂O/NCO groups.

"Available water" in the aqueous reactant is that water accessible for reaction with the resin reactant, and which is exclusive of water which may layer during reaction, or supplemental water which may be necessary because of further water-absorbtive or water-binding components or additives present in and forming the aqueous reactant.

The use of large molar excesses of water in the aqueous reactant leads to several important advantages and improvements over the conventional flame retardant polyurethane foam compositions. For example, in conventional polyurethane foam compositions, the water concentration must be carefully controlled to near the theoretical amount, usually an amount much less than about an H₂O Index Value of 400 (2.0 moles H₂O/NCO groups in the polyurethane reaction components) and the flame retardants must be separately included. This low concentration dictates the use of a catalyst to promote the rate of the polymerization foaming reaction, and requires an intensive mixing step to achieve good mixing of reactants and catalyst so as to insure a controllable and uniform cellular product, other additives are avoided. In contrast, the present invention requires a very large but controlled excess of water, e.g., typically about an H₂O Index Value of about 1300 to about 78,000. Using this technique, the product quality and uniformity is not highly sensitive to accuracy of metering or mixing of the aqueous reactant and the use of a polymerization catalyst is optional. Thus, the present additives are included in the polyurethane structure at the time of foaming.

There are two broad classes of suspending agents that can be used to form and maintain stable hydrated alumina slurries, (1) water soluble or hydrophilic polymers and (2) surfactants. Appropriate candidates from the latter would be further defined as amphoteric, cationic or non-ionic.

Examples of the polymeric suspending agents, often described as solution thickness, include but are not limited to hydroxyethyl cellulose polymers, sold as Natrosol TM by Hercules or as Cellosize TM by Union Carbide, hydroxy propyl cellulose sold as Klucel TM by Hercules, ethyl hydroxyethyl cellulose sold as EHEC TM by Hercules, ethyl cellulose, sodium carboxymethylcellulose, water soluble polyoxyethylene polymers sold by Polyox TM by Union Carbide Corp., gelatin, guar gums and agar.

Examples of amphoteric surfactants that can be used include but are not limited to Sulfobetain TA 75 (tallow amido ammonium sulfonic acid betain) sold by Textilana Corp. and Antaron FC34 (complex fatty amido compound) sold by General Aniline and Film. Examples of cationic surfactants include but are not limited to Aliquat TM 21 (n-fatty trimethyl quaternary ammonium chloride) and Aliquat TM 221 (n-difatty dimethyl quaternary ammonium chloride) sold by General Mills and Atlas TM G265 (quaternary ammonium compound) sold by ICI America. Examples of effective nonionic surfactants include but are not limited to Arlacel TM 20

(sorbitan monolaurate) and Arlacel TM 85 (sorbitan trioleate) made by ICI America, Pluronic TM L-72 (ethylene/propylene oxide condensation product with propylene glycol) or Pluronic TM P-75 (ethylene/propylene oxide condensation product with propylene glycol) made by BASF-Wyandotte and Tween TM 20 (POE(20) sorbitan monolaurate(polysorbate 20)) or Tween TM 85 (POE(20) sorbitan trioleate(polysorbate 85)) made by ICI America.

When hydrophylic polymers are used as the suspending agents, it is appropriate to use nonionic surfactants to control the cell size characteristics of the cellular plastic. Non-ionic surfactants with HLB numbers (hydrophobic to lyophobic balance) from 2 to 16 can be used.

If the suspending agent is a nonionic surfactant then it is appropriate to use either amphoteric or cationic surfactants to control the cellular structure.

The suspending agents may be added in an amount from 0.0001 to 0.04 parts by weight per part by weight of the resin reactant. Preferably the amount ranges from 0.001 to 0.01 parts by weight.

The cellular control surfactant may be added in an amount from about 0.0005 to .10 parts by weight per part of the resin reactant. Preferably, the amount ranges from 0.001 to 0.04 parts by weight.

The hydrophilic foams of the present invention may be formulated so as to be flexible, semi-rigid or rigid in nature and to be of primarily open cell or primarily closed cell structure as desied.

Because the present polyurethane composition is characterized with high flame retardancy and low smoke value it may be used for cushioning for furniture and transportation vehicles, mattresses, foamed coating for mattress covers and pads, upholstery fabrics, mattress ticking, sound absorbing wall coverings, carpet and rug underpadding, and the ike. Numerous additional uses will become obvious to those skilled in the art.

Practice of the present invention will become more apparant from the following examples wherein all parts are given by weight unless otherwise indicated.

EXAMPLE 1

A prepolymer is prepared from 2 moles of polyethylene glycol, 1000 M.W., one mole of Trimethylol propane and 7.7 moles of the commercial 80/20 mixture of 2, 4 and 2, 6-tolyldiisocyanate. 100 parts by weight of prepolymer, 10 parts of tris -2, 3-dibromopropyl phosphate and 0.63 parts of Aliquat 221 cationic surface were mixed. 150 parts of $H_2O$, 125 parts of $Al(OH)_3$ and 0.63 parts of Arlacel 85 nonionic surfactant were mixed for 45 seconds with a motor driven propeller blade and then added to the above prepolymer mixture. After creaming, the sample was poured into a mold. After curing, it was placed in a microwave oven for 6 minutes and then allowed to dry overnight in a 70° C. vacuum oven. The sample was cut for testing and conditioned for 24 hours at 50% relative humidity, 25° C. The oxygen index was 0.314. The sample was subjected to a standardized procedure of beatings by a motor driven paddle and lost 1.0% of its weight in dusting. Also, by a standard technique of motor driven washings in distilled water, 3.0% of the sample weight leached out. This foam was also made by spraying the aqueous solution from the Grac Hydra-Cat as in Example 2. Even after sitting in the sprayer overnight, the solution did not pack out.

EXAMPLE 2

One hundred parts by weight of the prepolymer of Example 1 were mixed with 1.0 part of Pluronic L-62 surfactant. Then, 100 parts of $Al(OH)_3$ and 100 parts of $H_2O$ were mixed. The foaming was attempted by using a Graco Hydra-Cat to spray the aqueous solution and mix with the polymer. However, the aqueous solution packed out in the sprayer.

This foam was also made according to the technique of Example 1. It was tested for dusting and washing as in Example 1; the percent weight loss for dusting was 7.0 and 8.5% for washing.

EXAMPLE 3

The procedure of Example 1 was repeated except using 100 parts by weight of prepolymer, 16 parts of tris-2, 3 dibromopropyl phosphate and 0.2 parts of Aliquat 221. 100 parts of $H_2O$ 100 parts of $Al(OH)_3$ and 0.2 part of Arlacel 85 were mixed for 45 seconds and added to the prepolymer mixture. Identical conditioning procedures followed. The oxygen index was 0.334. It was also tested for dusting and washing as in Example 1; the percent weight loss for dusting was 0.3 and 1.5% for washing.

EXAMPLE 4

The procedure of Example 1 was repeated except using 100 parts by weight of prepolymer, 20 parts of tris-2,3 dibromopropyl phosphate and 0.1 parts of Aliquat 221. 120 parts $H_2O$, 200 parts of $Al(OH)_3$ and 0.25 parts of hydroxyethyl cellulose were mixed for 45 seconds and added to the prepolymer mixture. After identical conditioning procedures, the oxygen index was 0.450. It was also tested for dusting and washing as in Example 1; the percent weight loss for dusting was 0.5 and 2.0% for washing.

EXAMPLE 5

One hundred parts by weight of prepolymer and 16 parts of tris-2,3 dibromopropyl phosphate were mixed. 0.5 parts of hydroxyethyl cellulose were added slowly to a mixture of 100 parts $H_2O$ and 0.2 parts Arlacel 85. This was allowed to stand 20 minutes, the 100 parts of $Al(OH)_3$ were added and this was added to the prepolymer mixture. After creaming, the sample was poured into a mole. The foam was dried for 24 hours in a 70° C. forced air oven. It was tested for dusting and washing as in Example 1; the percent weight loss for dusting was 0.7 and 1.6% for washing.

It is understood that the foregoing detailed description is given merely by way of illustration and that many variations may be made therein without departing from this invention.

What is claimed is:

1. In a cross-linked hydrophilic polyurethane foam system having flame retardancy, and three-dimensional network which consists essentially of the reaction product of a first component comprising either an isocyanate capped hydrophilic polyoxyethylene polyol resin prepolymer having an ethylene oxide content ranging from about 40 mole % to 100 mole % of the oxyalkylene units in said prepolymer, said prepolymer having an isocyanate functionality equal to 2 and crosslinking agent having a reaction functionality greater than two, said crosslinking agent selected from the group consisting of polyol, polyamine, polythiol or polyisocyanate; or said isocyanate capped polyol with an isocyanate functionality greater than 2; and a second component comprising water, wherein the H₂O Index Value of said isocyanate capped polyol and water is about 1,300 to about 78,000 wherein the polyoxyethylene polyol moiety has a weight average molcular weight of about 200 to about 20,000, and a hydroxyl functionality of about 2 to about 8, and a surfactant, the improvement which consists essentially of a combination of alumina hydrate powder having an average particle size of about 0.5 to about 120 microns and wherein alumina hydrate is present in an amount from about 50 to about 400 parts by weight per 100 parts by weight of said prepolymer resin, and a nonionic suspending agent, said surfactant being a cationic or amphoteric surfactant.

2. The polyurethane foam system of claim 1 wherein the amount of alumina hydrate is about 100 to about 275 parts by weight, and the particle size is about 6.5 to about 9.5 microns.

3. In a method for preparing cross-linked hydrophilic polyurethane foam system having a three-dimensional network which consists essentially of reacting a first component comprising either an isocyanate capped hydrophilic polyoxyethylene polyol resin prepolymer having an ethylene oxide content ranging from about 40 mole % to 100 mole % of the oxyalkylene units in said prepolymer, said prepolymer having an isocyanate functionality equal to 2 and a crosslinking agent having a reaction functionality greater than two, said crosslinking agent selected from the group consisting of polyol, polyamine, polythiol or polyisocyanate; or said isocyanate capped polyol with an isocyanate functionality greater than 2; and a second component comprising water, wherein the H₂O Index Value of said capped polyol and water is about 1,300 to about 78,000, wherein the polyoxyethylene polyol moiety has a weight average molcular weight of about 200 to about 20,000, and a hydroxyl functionality of about 2 to about 8, and a surfactant, the improvement which consists essentially of inclusion in said reaction of the combination of alumina hydrate powder having an average particle size of about 0.5 to about 120 microns and wherein alumina hydrate is present in an amount from about 50 to about 400 parts by weight per 100 parts by weight of said prepolymer resin, and a nonionic suspending agent, said surfactant being a cationic or amphoteric surfactant.

4. The method of claim 3 wherein the amount of alumina hydrate is about 100 to about 275 parts by weight, and the particle size is about 6.9 to about 9.5 microns.

5. A hydrophilic foam as in claim 1 wherein the suspending agent is a cellulosic suspending agent.

6. A foam as in claim 1 wherein the suspending agent is present in an amount from 0.0001 to 0.04 parts by weight per part by weight of the prepolymer resin.

7. A foam as in claim 1 wherein the crosslinking agent is a polyisocyanate.

8. A method as in claim 3 wherein a cellulosic suspending agent is employed.

9. A method as in claim 3 wherein the suspending agent is present in an amount from 0.0001 to 0.04 parts by weight per part by weight of the prepolymer resin.

10. A method as in claim 3 wherein the crosslinking agent is a polyisocyanate.

11. In a cross-linked hydrophilic polyurethane foam system having flame retardancy, and a three-dimensional network which consists essentially of the reaction product of (1) a first component comprising either an (A) isocyanate capped hydrophilic polyoxyethylene polyol resin prepolymer having an ethylene oxide content ranging from about 40 mole % to 100 mole % of the oxyalkylene units in said prepolymer, said prepolymer having an isocyanate functionality equal to 2 and a crosslinking agent having a reaction functionality greater than 2, said crosslinking agent selected from the group consisting of polyol, polyamine, polythiol or polyisocyanate; or (B) said isocyanate capped polyol having an isocyanate functionality greater than 2; and (2) a second component comprising water, wherein the H₂O Index Value of said isocyanate capped polyol and water is from about 1,300 to about 78,000, and wherein the polyoxyethylene polyol moiety has a weight average molecular weight of about 200 to about 20,000, and a hydroxyl functionality of from about 2 to about 8 and (3) a cationic or amphoteric surfactant: the improvement which consists essentially of a combination of alumina hydrate powder having an average particle size of about 0.5 to about 120 microns, from about 50 to about 400 parts by weight of alumina hydrate being present per 100 parts by weight of said prepolymer resin, (4) a nonionic suspending agent, and (5) a phosphorous flame retardant agent.

12. A foam as in claim 11 wherein the amount of alumina hydrate is about 100 to about 275 parts by weight, and the particle size is about 6.5 to about 9.5 microns.

13. A foam as in claim 11 wherein the suspending agent is a cellulosic suspending agent.

14. A foam as in claim 11 wherein the suspending agent is present in an amount from 0.0001 to 0.04 parts by weight per part by weight of the prepolymer resin.

15. A foam as in claim 11 wherein the crosslinking agent is a polyisocyanate.

* * * * *